US011936837B2

(12) United States Patent
Takamizawa

(10) Patent No.: US 11,936,837 B2
(45) Date of Patent: Mar. 19, 2024

(54) PREDICTING OUTPUT CHARACTERISTICS OF IMAGE FORMING APPARATUSES, IMAGE FORMING SYSTEMS, AND IMAGE FORMING METHODS

(71) Applicant: Takuma Takamizawa, Kanagawa (JP)

(72) Inventor: Takuma Takamizawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 17/959,796

(22) Filed: Oct. 4, 2022

(65) Prior Publication Data

US 2023/0130618 A1 Apr. 27, 2023

(30) Foreign Application Priority Data

Oct. 27, 2021 (JP) .................................. 2021-175494

(51) Int. Cl.
*H04N 1/60* (2006.01)
(52) U.S. Cl.
CPC ......... *H04N 1/6091* (2013.01); *H04N 1/6027* (2013.01); *H04N 1/6033* (2013.01); *H04N 1/6097* (2013.01)
(58) Field of Classification Search
None
See application file for complete search history.

(56) References Cited

U.S. PATENT DOCUMENTS 6,297,873 B1 * 10/2001 Furuya ................. H04N 1/6091
358/406

6,585,340 B1 * 7/2003 Borrell ................. H04N 1/6033
358/1.9

(Continued)

FOREIGN PATENT DOCUMENTS

EP 1267217 A2 12/2002
JP 2004-185029 7/2004
(Continued)

OTHER PUBLICATIONS

Extended European Search Report dated Mar. 7, 2023 issued in corresponding European Appln. No. 22199667.1.
(Continued)

*Primary Examiner* — Scott A Rogers
(74) *Attorney, Agent, or Firm* — Harness, Dickey & Pierce, P.L.C.

(57) ABSTRACT

An image forming apparatus includes a memory and circuitry. The memory stores a colorimetric value of a gradation correction chart and environmental information each time of acquisition of the colorimetric value. The circuitry predicts an output characteristic of an image formed by the image forming apparatus based on the colorimetric value associated with particular environmental information among the environmental information stored in the memory, the particular environmental information being within a predetermined range with reference to current environmental information, when the image forming apparatus is to output the gradation correction chart. The circuitry adjusts the output characteristic of the image in a case that the predicted output characteristic is lower than a target output characteristic. The circuitry corrects a gradation correction table based on the colorimetric value of the gradation correction chart and the target output characteristic.

10 Claims, 8 Drawing Sheets

(56) References Cited

U.S. PATENT DOCUMENTS

| | | | |
|---|---|---|---|
| 6,900,911 B1* | 5/2005 | Yamazaki | H04N 1/40 358/530 |
| 6,985,254 B2* | 1/2006 | Allen | H04N 1/6033 358/1.9 |
| 10,015,368 B2* | 7/2018 | Kishi | H04N 1/00307 |
| 10,620,577 B2* | 4/2020 | Takemura | G03G 15/0887 |
| 10,922,591 B2* | 2/2021 | Shibuya | G06K 15/027 |
| 2015/0138575 A1 | 5/2015 | Takamizawa | |
| 2015/0168901 A1 | 6/2015 | Yasuda | |
| 2016/0077482 A1 | 3/2016 | Takamizawa | |
| 2018/0017923 A1 | 1/2018 | Ohta et al. | |
| 2022/0174185 A1 | 6/2022 | Takamizawa | |

FOREIGN PATENT DOCUMENTS

| | | |
|---|---|---|
| JP | 2009-071617 | 4/2009 |
| JP | 2014-007647 | 1/2014 |
| JP | 2017-037100 | 2/2017 |
| JP | 2020-106677 | 7/2020 |

OTHER PUBLICATIONS

Kuo, Y.F. et al. "Model-Based Calibration Approach to Improve Tone Consistency for Color Electrophotography." *Journal of Imaging Science and Technology*, vol. 55, No. 6 (2011): pp. 1-9.

* cited by examiner

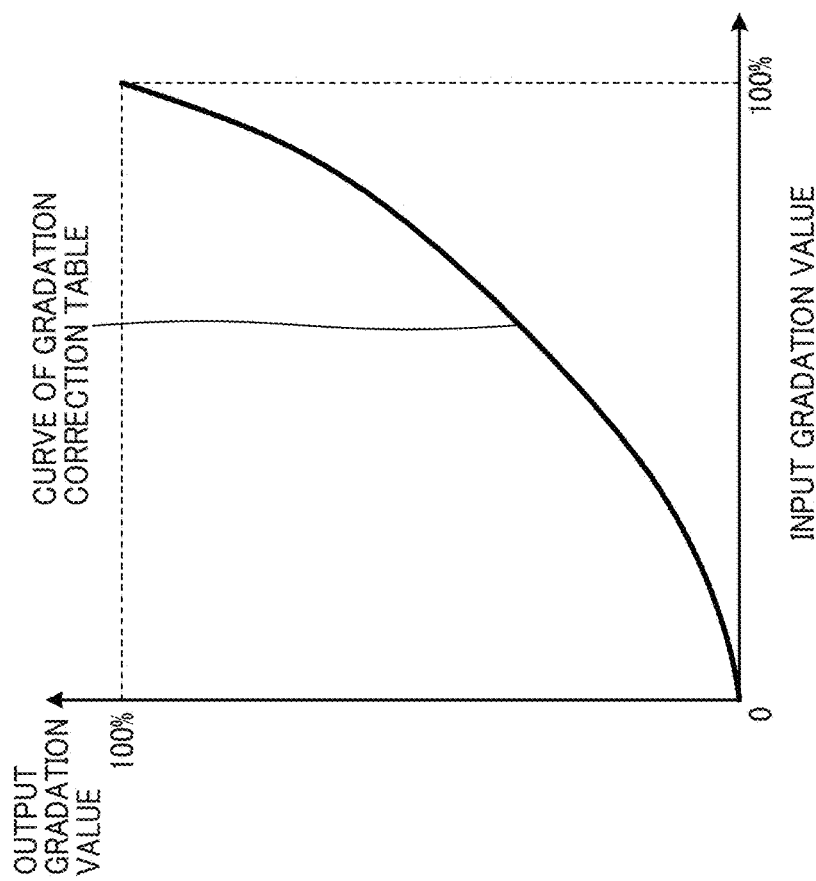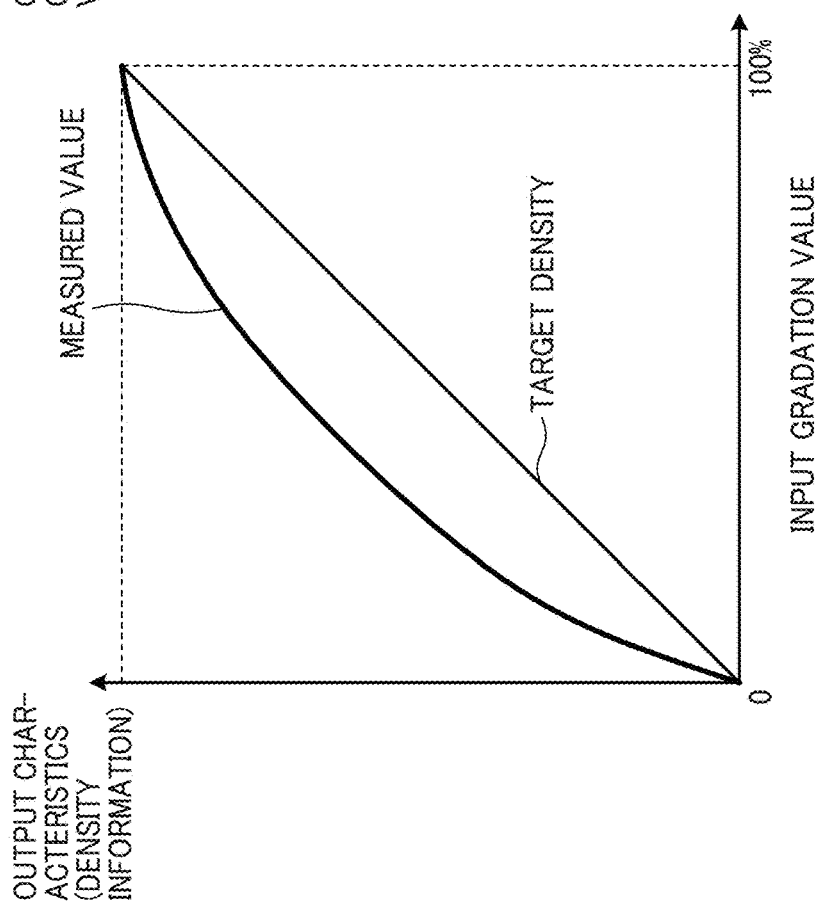

FIG. 5

| SHEET OF PAPER | TARGET MAX DENSITY INFORMATION | | | |
|---|---|---|---|---|
| | C | M | Y | K |
| COATED PAPER-GLOSS A | 1.63 | 1.39 | 1.01 | 1.79 |
| COATED PAPER-GLOSS B | 1.61 | 1.37 | 1.00 | 1.77 |
| COATED PAPER-GLOSS C | 1.68 | 1.44 | 1.05 | 1.86 |
| COATED PAPER-MATT A | 1.55 | 1.32 | 0.96 | 1.70 |
| COATED PAPER-MATT B | 1.53 | 1.30 | 0.95 | 1.68 |
| COATED PAPER-MATT C | 1.60 | 1.37 | 1.00 | 1.77 |
| PLAIN PAPER A | 1.30 | 1.11 | 0.81 | 1.43 |
| PLAIN PAPER B | 1.29 | 1.10 | 0.80 | 1.42 |
| PLAIN PAPER C | 1.34 | 1.15 | 0.84 | 1.49 |

FIG. 6

COATED PAPER-GLOSS A

| DATE AND TIME OF CALIBRATION | MAX DENSITY ADJUSTMENT AMOUNT | | | | MAX DENSITY INFORMATION (COLORIMETRIC VALUE) | | | | TEMPERA-TURE (°C) | HUMIDITY (%) |
|---|---|---|---|---|---|---|---|---|---|---|
| | C | M | Y | K | C | M | Y | K | | |
| 2021/1/5 10:00 | 1 | 0 | 0 | 1 | 1.67 | 1.43 | 1.04 | 1.85 | 22.5 | 30 |
| 2021/1/5 15:00 | 0 | 0 | 0 | 0 | 1.61 | 1.37 | 1.01 | 1.77 | 25.0 | 45 |
| 2021/1/5 18:00 | -1 | -1 | -1 | -1 | 1.59 | 1.33 | 0.98 | 1.74 | 20.0 | 57 |
| 2021/1/6 10:00 | 1 | 2 | 3 | 2 | 1.69 | 1.44 | 1.04 | 1.88 | 23.0 | 28 |
| 2021/1/6 15:00 | 0 | 0 | 0 | -1 | 1.63 | 1.39 | 1.00 | 1.75 | 26.5 | 42 |
| 2021/1/6 18:00 | -1 | -2 | -1 | -2 | 1.60 | 1.33 | 0.99 | 1.73 | 21.0 | 55 |
| 2021/1/7 10:00 | 0 | 0 | 0 | 0 | 1.62 | 1.41 | 1.02 | 1.81 | 24.5 | 36 |
| 2021/1/7 15:00 | -1 | 0 | 1 | 2 | 1.60 | 1.39 | 1.01 | 1.76 | 26.0 | 45 |
| 2021/1/7 18:00 | 1 | 2 | 1 | 2 | 1.66 | 1.44 | 1.03 | 1.83 | 22.0 | 33 |
| 2021/1/8 10:00 | 1 | 2 | 1 | 1 | 1.67 | 1.44 | 1.04 | 1.84 | 22.0 | 31 |
| 2021/1/8 15:00 | 0 | 0 | 0 | -1 | 1.62 | 1.42 | 1.02 | 1.81 | 24.5 | 40 |
| 2021/1/8 18:00 | -1 | -3 | -1 | -1 | 1.60 | 1.33 | 0.99 | 1.75 | 20.5 | 60 |

FIG. 7

| SHEET OF PAPER | TEMPERATURE (°C) | HUMIDITY (%) | TARGET MAX DENSITY INFORMATION | | | | PREDICTED MAX DENSITY INFORMATION | | | | MAX DENSITY ADJUSTMENT AMOUNT (CURRENT) | | | | MAX DENSITY ADJUSTMENT AMOUNT (AFTER CHANGE) | | | |
|---|---|---|---|---|---|---|---|---|---|---|---|---|---|---|---|---|---|---|
| | | | C | M | Y | K | C | M | Y | K | C | M | Y | K | C | M | Y | K |
| COATED PAPER-GLOSS A | 23.0 | 33 | 1.63 | 1.39 | 1.01 | 1.79 | 1.60 | 1.41 | 1.03 | 1.73 | 1 | −1 | 2 | 0 | 2 | −1 | 2 | 2 |

PREDICTING OUTPUT CHARACTERISTICS OF IMAGE FORMING APPARATUSES, IMAGE FORMING SYSTEMS, AND IMAGE FORMING METHODS

CROSS-REFERENCE TO RELATED APPLICATION

This patent application is based on and claims priority pursuant to 35 U.S.C. § 119(a) to Japanese Patent Application No. 2021-175494, filed on Oct. 27, 2021, in the Japan Patent Office, the entire disclosure of which is hereby incorporated by reference herein.

BACKGROUND

Technical Field

Embodiments of the present disclosure relate to an image forming apparatus, an image forming system, and an image forming method.

Related Art

Calibration performed by an image forming apparatus such as a printer is a technology for achieving stable print quality by correcting output data for matching current density characteristics (an example of an output characteristic) of the printer with target density characteristics (an example of a target output characteristic).

In the above technology, the density characteristics have to be adjusted before calibration, and a chart has is to be printed in order to measure the current density characteristics. For this reason, in the above-described technology, when the density characteristics is not actually required, in other words, when the calibration target density characteristics is obtained, a chart for measuring the density characteristics is always printed. This produces waste sheets.

SUMMARY

An embodiment of the present disclosure includes an image forming apparatus including a memory and circuitry. The memory stores a colorimetric value of a gradation correction chart that is output by the image forming apparatus and environmental information each time of acquisition of the colorimetric value. The circuitry predicts an output characteristic of an image formed by the image forming apparatus based on the colorimetric value associated with particular environmental information among the environmental information stored in the memory, the particular environmental information being within a predetermined range with reference to current environmental information, when the image forming apparatus is to output the gradation correction chart. The circuitry adjusts the output characteristic of the image formed by the image forming apparatus in a case that the predicted output characteristic is lower than a target output characteristic that is set in advance for input image data according to which the image forming apparatus performs an image output. The circuitry corrects a gradation correction table based on the colorimetric value of the gradation correction chart that is output by the image forming apparatus and the target output characteristic.

An embodiment of the present disclosure includes an image forming system including a memory and circuitry. The memory stores a colorimetric value of a gradation correction chart that is output by the image forming system and environmental information each time of acquisition of the colorimetric value. The circuitry predicts an output characteristic of an image formed by the image forming system based on the colorimetric value associated with particular environmental information among the environmental information stored in the memory, the particular environmental information being within a predetermined range with reference to current environmental information, when the image forming system is to output the gradation correction chart. The circuitry adjusts the output characteristic of the image formed by the image forming system in a case that the predicted output characteristic is lower than a target output characteristic that is set in advance for input image data according to which the image forming system performs an image output. The circuitry corrects a gradation correction table based on the colorimetric value of the gradation correction chart that is output by the image forming system and the target output characteristic.

An embodiment of the present disclosure includes an image forming method performed by an image forming apparatus. The method includes predicting an output characteristic of an image formed by the image forming apparatus based on a colorimetric value associated with particular environmental information among environmental information stored in a memory that stores the colorimetric value of a gradation correction chart that is output by the image forming apparatus and the environmental information each time of acquisition of the colorimetric value, the particular environment information being within a predetermined range with reference to current environmental information, when the image forming apparatus is to output the gradation correction chart. The method includes adjusting the output characteristic of the image formed by the image forming apparatus in a case that the predicted output characteristic is lower than a target output characteristic that is set in advance for input image data according to which the image forming apparatus performs an image output. The method includes correcting a gradation correction table based on the colorimetric value of the gradation correction chart that is output by the image forming apparatus and the target output characteristic.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4A and FIG. 4B are diagrams for describing an example of an operation for generating a gradation correction table in the image forming apparatus, according to an embodiment of the present disclosure;

FIG. 5 is a table of an example of target max density information in the image forming apparatus, according to an embodiment of the present disclosure;

FIG. 6 is a table of an example of stored max density adjustment amount, max density information, and temperature and humidity information in the image forming apparatus, according to an embodiment of the present disclosure;

FIG. 7 is a table of an example of predicted max density information and max density adjustment amount in the image forming apparatus, according to an embodiment of the present disclosure.

Figure 1:
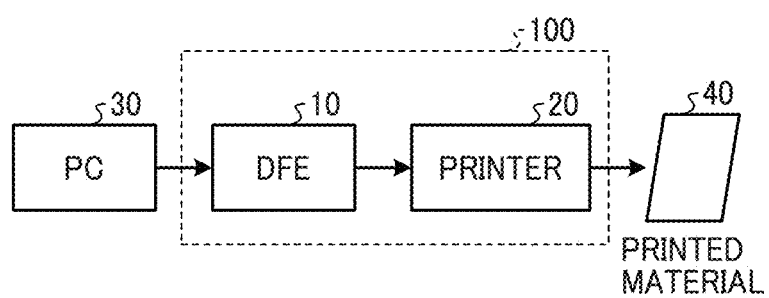
FIG. 1 is a block diagram of an example of a schematic configuration of an image forming apparatus, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of an image forming apparatus, an image forming system, and an image forming method, and carrier means are described with reference to the accompanying drawings.

FIG. 1 is a block diagram of an example of a schematic configuration of an image forming apparatus 100 according to the present embodiment. As illustrated in FIG. 1, the image forming apparatus 100 according to the present embodiment includes a digital front end (DFE) 10 as a control device and a printer 20 connected to each other.

The DFE 10 communicates with the printer 20 and controls formation (output) of an image by the printer 20. A personal computer (PC) 30 is connected to the DFE 10. In another example, the DFE 10 is connected the PC 30 through a network. The PC 30 creates image information described in a computer language such as page description language (PDL) with application software installed on the PC in advance, and sends the created image information to the DFE 10. The DFE 10 converts the image information described in a computer language such as the PDL to image data rendered in a format that can be printed by the printer 20, and sends the image data to the printer 20. The image data is an example of input image data.

The DFE 10 includes, as a hardware configuration, a central processing unit (CPU), a main memory including a read only memory (ROM) and a random access memory (RAM), and an auxiliary memory such as a hard disk drive (HDD). The CPU controls overall operation of the DFE 10. The main memory stores various data and programs. The auxiliary memory stores various data and programs. The DFE 10 has a hardware configuration implemented by a general-purpose computer. The CPU of the DFE 10 executes the various programs stored in the main memory and the auxiliary memory to implement various processes by the DFE 10. In another example, various processes by the DFE 10 are implemented by individual circuits (hardware).

The printer 20 includes individual color materials such as cyan, magenta, yellow, and black (CMYK), an image forming unit, and a fixing mechanism for fixing the color materials. The printer 20 performs image formation and fixing using the color materials according to the image data sent from the DFE 10. In other words, the printer 20 is an example of an image forming unit that performs an image output according to the image data sent from the DFE 10. Thus, an image is formed on a recording medium such as a sheet of paper, and a desired printed material 40 is obtained. In one example, characteristic processes by the image forming apparatus 100 according to the present embodiment are performed by the DFE 10 alone. In another example, characteristic processes by the image forming apparatus 100 according to the present embodiment are performed by the printer 20 alone. The printer 20 has a configuration using an electrophotographic printer and toner or a configuration using an inkjet printer and ink.

Figure 2:
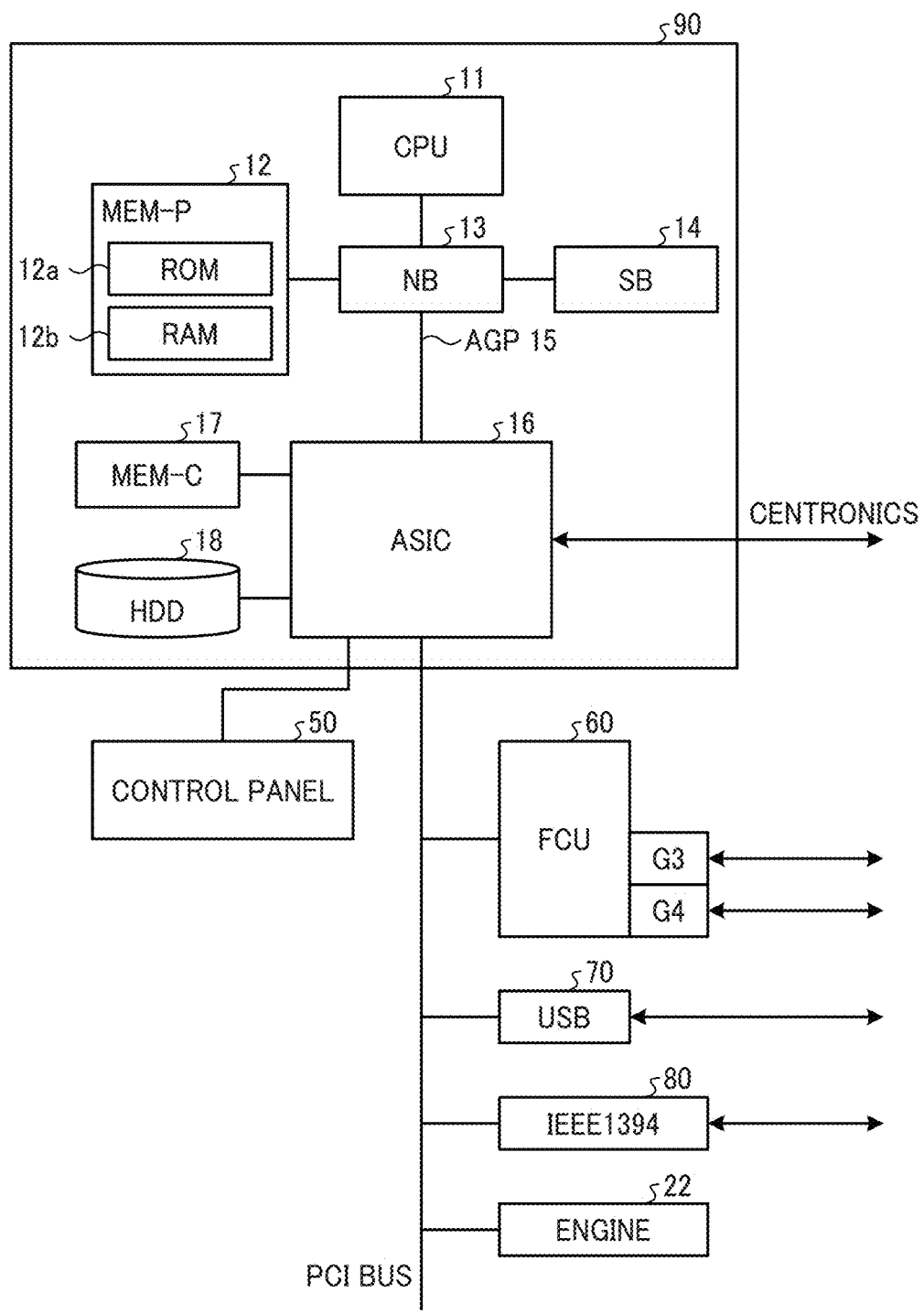
FIG. 2 is a block diagram of a hardware configuration of the image forming apparatus, according to an embodiment of the present disclosure.

FIG. 2 is a block diagram of a hardware configuration of the image forming apparatus 100 according to the present embodiment. As illustrated in FIG. 2, the image forming apparatus 100 according to the present embodiment includes a controller 90 and an engine 22, which is the printer 20, connected with each other via a peripheral component interconnect (PCI) bus.

The controller 90 controls overall operation of the image forming apparatus 100, rendering, communications, and inputs from an operation unit. The engine 22 is, for example, a printer engine connectable to the PCI bus. Examples of the engine 22 include, but are not limited to, an electrophotographic printer and an inkjet printer.

The controller 90 includes a CPU 11, a north bridge (NB) 13, a system memory (MEM-P) 12, a south bridge (SB) 14, a local memory (MEM-C) 17, an application specific integrated circuit (ASIC) 16, and an HDD 18. The NB 13 and the ASIC 16 are connected with each other via an accelerated graphics port (AGP) bus 15. The MEM-P 12 includes a ROM 12*a* and a RAM 12*b*.

The CPU 11 controls overall operation of the image forming apparatus 100. The CPU 11 includes a chipset including the NB 13, the MEM-P 12, and the SB 14, and is connected to other devices via the chipset.

The NB 13 is a bridge that connects the CPU 11, the MEM-P 12, the SB 14, and the AGP bus 15, and includes a memory controller that controls reading from and writing to the MEM-P 12, a PCI master, and an AGP target.

The MEM-P 12 is a system memory used as a memory for storing programs and data, a memory for loading programs and data, and a memory for loading drawing data for printing, for example. The MEM-P 12 includes a ROM 12*a* and a RAM 12*b*. The ROM 12*a* is a read only memory used as a memory to store programs and data. The RAM 12*b* is a read-write memory used as, for example, a memory to deploy programs and data and a memory to store drawing data for printing.

The SB 14 is a bridge that connects the NB 13 to a PCI device or a peripheral device. The SB 14 is connected to the NB 13 via the PCI bus. A network interface is also connected to the PCI bus.

The ASIC 16 is an integrated circuit adopted for image processing that includes hardware elements for image processing. The ASIC 16 serves as a bridge that connects the AGP bus 15, the PCI bus, the HDD 18, and the MEM-C 17. The ASIC 16 includes a PCI target, an AGP master, an arbiter (ARB), which is a core of the ASIC 16, a memory controller that controls the MEM-C 17, a plurality of direct memory access controllers (DMACs) that performs, for example, image rotation by hardware logic, and a PCI unit that performs data transfer with the engine 22 via the PCI bus.

A facsimile control unit (FCU) 60, a universal serial bus (USB) 70, and an Institute of Electrical and Electronics Engineers 1394 (IEEE 1394) interface 80 are connected to the ASIC 16 via the PCI bus.

A control panel 50 is directly connected to the ASIC 16.

The MEM-C 17 is a local memory used as a copy image buffer and a code buffer. The HDD 18 is a storage that stores image data, programs, font data, and forms.

The AGP bus 15 is a bus interface for a graphics accelerator card proposed to increase the speed of graphics processing, and directly accesses the MEM-P 12 with high throughput to increase the speed of the graphics accelerator card.

Processes of the present embodiment are implemented by the CPU 11 executing a program. Data used in executing the program are stored in, for example, the RAM 12b. The hardware configuration illustrated in the figure is merely one example. In another example, the image forming apparatus 100 has any other suitable hardware configuration, provided that the hardware configuration implements processes of the present embodiment.

Figure 3:
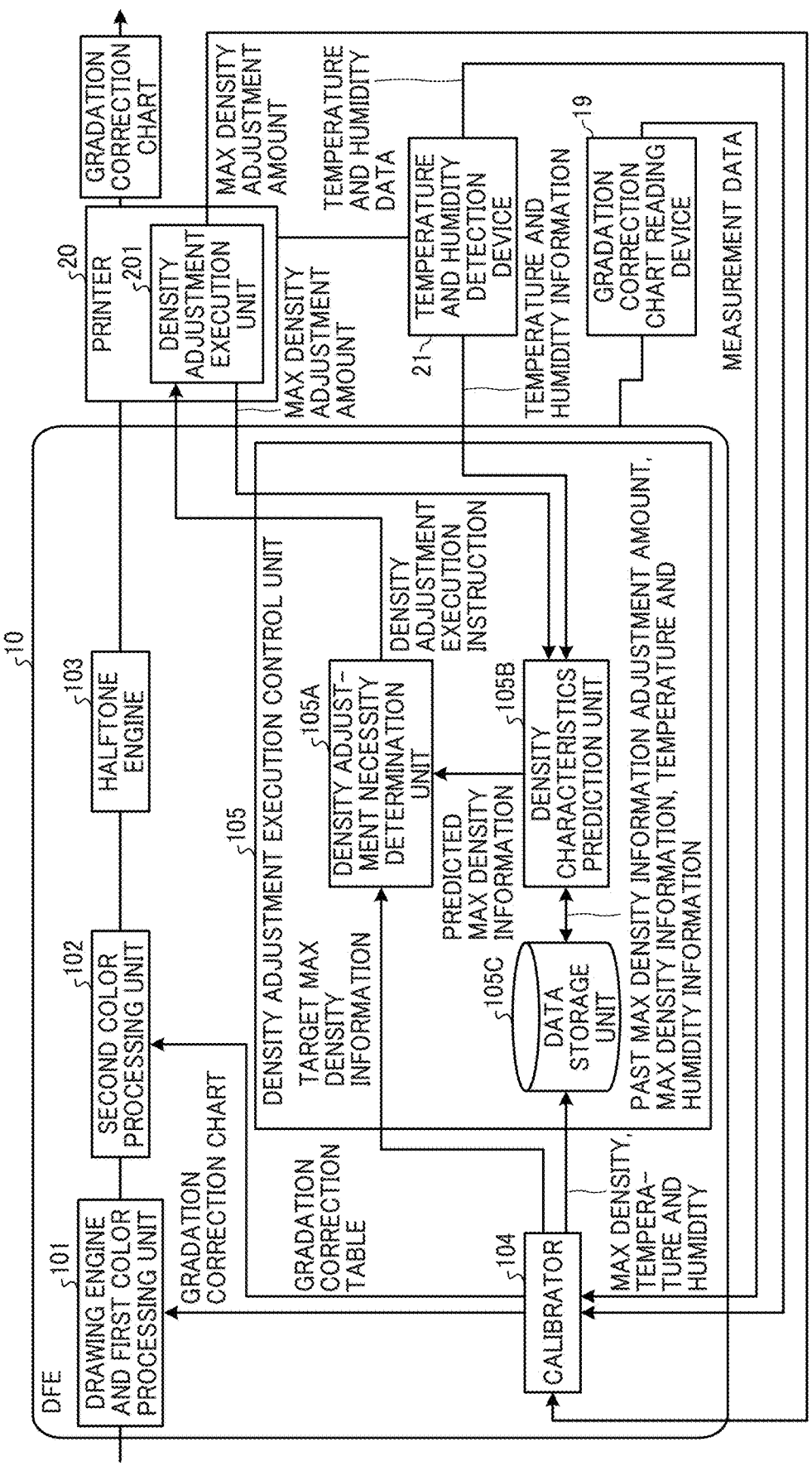
FIG. 3 is a block diagram illustrating an example of a functional configuration and a relating hardware configuration of the image forming apparatus, according to an embodiment of the present disclosure.

FIG. 3 is a diagram illustrating an example of a functional configuration and a relating hardware configuration of the image forming apparatus 100, according to the present embodiment. A drawing engine and first color processing unit 101 performs language interpretation, vector-raster conversion, color conversion to process colors (e.g., CMYK) on an electronic document created by the PC 30. The resolution of rendering in the vector-raster conversion is, for example, 1200 dots per inch (dpi).

The second color processing unit 102 performs gradation correction for calibration and total amount restriction processing for restricting the total amount of color materials. Specifically, the second color processing unit 102 is an example of a gradation correction unit that corrects the gradation value of the image data using a gradation correction table.

A halftone engine 103 converts 8-bit data of each color into a format of the image data for the printer 20 (e.g., 2-bit image data for each color), and sends the image data obtained by the conversion to the printer 20.

A calibrator 104 performs calibration including gradation correction. When the calibrator 104 performs calibration, a gradation correction chart reading device 19 performs colorimetry on a printed gradation correction chart. In one example, the gradation correction chart reading device 19 is an external apparatus used as being connected to the DFE 10. In another example, the gradation correction chart reading device 19 is an in-line device built in the printer 20.

The calibrator 104 functions as an example of a gradation correction table correction unit that corrects the gradation correction table on the basis of max density information of the gradation correction chart and target max density information. The max density information is an example of a colorimetric value. The target max density information is an example of a target output characteristic. The calibrator 104 also functions as an example of a target output characteristic storage unit that stores a target output characteristic such as the target max density information set in advance for image data. Further, the calibrator 104 notifies a density adjustment necessity determination unit 105A described below of the target max density information of each color material. Furthermore, the calibrator 104 notifies max density information of the printer 20, temperature and humidity information (an example of environment information), a calibration execution condition such as a sheet type at the time of outputting the gradation correction chart. The max density information of the printer is an example of an output characteristic. The temperature and humidity information is an example of environment information.

A density adjustment execution control unit 105 includes the density adjustment necessity determination unit 105A, a density characteristic prediction unit 105B, and a data storage unit 105C.

In response to receiving an instruction to perform density characteristic prediction from the density adjustment necessity determination unit 105A, the density characteristic prediction unit 105B acquires an adjustment amount (e.g., a max density adjustment amount) of the output characteristic such as the current max density information of the printer 20 from a density adjustment execution unit 201. Further, the density characteristic prediction unit 105B acquires temperature and humidity information from a temperature and humidity detection device 21. In the embodiment, the temperature and humidity information includes information on the current temperature and humidity. The printer 20 can typically adjust max density information of a color material to be printed, and stores a max density adjustment amount for each color material. The density adjustment execution unit 201 increases or decreases the density at the time of printing according to the max density adjustment amount.

Further, the printer 20 typically includes a temperature and humidity detection device that detects temperature and humidity information of the printer 20. The temperature and humidity information of the printer 20 includes information on the inside and the outside of the printer 20. In the present embodiment, either the temperature and humidity information on the inside of the printer 20 or the temperature and humidity information on the outside of the printer 20 may be used, provided that one of the temperature and humidity information on the inside of the printer or the temperature and humidity information on the outside of the printer is used.

The density characteristic prediction unit 105B refers to the data storage unit 105C to predict max density information in a similar environment in the past on the basis of the current max density adjustment amount and the current temperature and humidity information. The density characteristic prediction unit 105B notifies the density adjustment necessity determination unit 105A of the predicted max density information. Specifically, the density characteristic prediction unit 105B functions as an example of an output characteristic prediction unit that predicts max density information (an example of an output characteristic) of an image by the printer 20 on the basis of max density information associated with temperature and humidity information within a predetermined range with reference to current temperature and humidity information among the temperature and humidity information stored in the data storage unit 105C when outputting an image of the gradation correction chart. In the embodiment, the predetermined range is a range set in advance. Since the output characteristic of the printer 20 mainly depends on temperature and humidity, the accuracy of the max density information is enhanced by predicting the max density information based on the past max density information in an environment similar to the past temperature and humidity.

In the data storage unit 105C, information such as the max density adjustment amount, the max density information, and the temperature and humidity information obtained by performing colorimetry on the gradation correction chart in the past are stored in association with calibration conditions. In the present embodiment, data are stored in the data storage unit 105C in any time period. In the present embodiment, the density characteristic prediction unit 105B predicts the max density information based on the past similar environment in any suitable methods. For example, the density characteristic prediction unit 105B predicts max density information using a method such as a regression analysis. A time period of the past data used for predicting the max density information is, for example, designated by a user or a system. For example, data within the past one month are used for the prediction. In another example, data of only December are used for the prediction. In one example, the accuracy of the prediction of the max density information may be quantified into a numerical value, and the numerical value is notified to a user. In one example, when the prediction accuracy of the max density information is low, recommendation of checking of the density information by actual measurement is notified.

In one example, in a case that the past max density information required for the prediction of the max density information of the printer 20 is insufficient, the density characteristics prediction unit 105B allows a user to select whether to adjust the max density information of the printer 20. In the embodiment, the case that the past max density information is insufficient is, for example, a case that the number of pieces of max density information stored in the data storage unit 105C is smaller than a preset number.

In one example, the image forming apparatus 100 includes an instruction unit that instructs the calibrator 104 to correct the gradation correction table. For example, the instruction unit instructs the calibrator 104 to correct the gradation correction table automatically or manually via a user interface. In this case, the density characteristic prediction unit 105B predicts the max density information in response to an instruction from the instruction unit before outputting the gradation correction chart. With this configuration, the max density information is automatically predicted before the start of the calibration in response to an instruction of calibration. Thus, usability is enhanced.

The density adjustment necessity determination unit 105A compares, for each color, the target max density information with the max density information predicted by the density characteristic prediction unit 105B. In the following description, the max density information predicted by the density characteristic prediction unit 105B may be referred to simply as "predicted max density information." When the target max density information is higher than the predicted max density information for a certain color, the density adjustment necessity determination unit 105A determines that density adjustment is to be performed for the certain color.

In this case, the density adjustment necessity determination unit 105A calculates how much adjustment is to be performed, i.e., the max density adjustment amount, on the basis the difference between the target max density information and the predicted max density information, and instructs the density adjustment execution unit 201 to perform density adjustment on the basis of the calculated max density adjustment amount. The density adjustment execution unit 201 is an output characteristic adjustment unit that performs adjustment of density information (an example of an output characteristic) according to the max density adjustment amount. With this configuration, colorimetric data of the gradation correction chart at the time of performing calibration in the past and the temperature and humidity information at the time of acquiring the colorimetric data are stored, and the current max density information of the image forming apparatus 100 is predicted on the basis of the current temperature and humidity information and the stored past data. When the predicted max density information satisfies the target max density information, the density adjustment of the image forming apparatus 100 is not performed. This reduces wasted sheets and efforts in printing and colorimetry of a chart for adjusting the density information of an image forming apparatus 100.

In one example, when the predicted max density information is lower than the target max density information, the density adjustment necessity determination unit 105A (an example of a notification unit) notifies a user that an output characteristic of the printer 20 is adjusted. With this configuration, the user can confirm that the printer 20 is automatically adjusted to have appropriate output characteristics.

When the predicted max density information is higher than the target max density information for a certain color, the density adjustment necessity determination unit 105A determines that adjustment of the max density information does not have to be performed for the certain color. In this case, the density adjustment execution unit 201 does not perform density adjustment for the certain color.

After the density adjustment necessity determination unit 105A determines whether the density adjustment is to be performed and the density adjustment execution unit 201 performs the density adjustment, the DFE 10 and the printer 20 process and print the gradation correction chart output from the calibrator 104. Before printing the gradation correction chart, adjustment is performed as needed to stabilize an output of the printer 20.

The gradation correction chart reading device 19 performs colorimetry on the gradation correction chart and notifies the calibrator 104 of measurement data (colorimetric value) such as the max density information. The calibrator 104 updates (corrects) the gradation correction table on the basis of the measurement data and the target max density information. With this configuration, the current gradation characteristic of the printer 20 is corrected to implement an image output with a target gradation characteristic.

In addition, the calibrator 104 stores the current max density information, and the max density adjustment amount and the temperature and humidity information acquired from the density adjustment execution unit 201 and the temperature and humidity detection device 21 in the data storage unit 105C. Storing the above information in the data storage unit 105C each time calibration is performed implements highly accurate density prediction.

When calibration is newly performed, typically, the target max density information is not created yet, and the target max density information is determined on the basis of the color measurement result of the gradation correction chart. For this reason, when the calibration is newly performed, the printing of the gradation correction chart, the colorimetry, and the generation of the gradation correction table are performed without performing the determination as to whether the density adjustment is to be performed and the density adjustment.

FIG. 4A and FIG. 4B are diagrams for describing an example of an operation for generating the gradation correction table in the image forming apparatus 100, according to the present embodiment. In FIG. 4A, a vertical axis represents an output characteristic (density information) of the printer 20, and a horizontal axis represents a gradation value (input gradation value) of an image data input to the printer 20. In FIG. 4B, a vertical axis represents a gradation value (output gradation value) of an image output from the printer 20, and a horizontal axis represents an input gradation value.

Typically, the output characteristic of the image forming apparatus 100 is likely to fluctuate depending on the environment. For this reason, in a typical calibration method, an actual output characteristic is obtained by measuring a density for each gradation value, and the actual output characteristic is compared with a target output characteristic for each gradation value. According to the comparison result, a gradation correction table for obtaining an output characteristic close to the target output characteristic is generated. Gradation correction is performed using the gradation correction table.

FIG. 4A illustrates a graph of target density characteristics for gradation values and a curve graph of actually measured output density. In the example of FIG. 4A, the actual density (an example of the output characteristic) is higher than the target density (an example of the target output characteristic) at each gradation value. FIG. 4B illustrates a curve graph of the gradation correction table generated on the basis of the target characteristic and the measured value (output characteristic).

Since the actual density is higher than the target density, the second color processing unit 102 performs correction such that the output gradation value for each input gradation value is lowered using the curve of the gradation correction table for correcting the actual density.

FIG. 5 is a table of an example of target max density information in the image forming apparatus 100, according to the present embodiment. Calibration is performed in order to match the gradation characteristic of an image output from the printer 20 to the target gradation characteristic. Since the gradation characteristics of multiple color material are different from each other, the target max density information is typically provided for each color material. Further, even when printing is performed with the same color material, the gradation characteristic changes depending on the characteristic of a sheet. Accordingly, calibration is typically performed for each sheet. For this reason, as illustrated in FIG. 5, the printer 20 stores the target max density information for multiple combinations of a calibration condition (sheet) and color.

In calibration, gradation correction is performed using halftone density information in addition to the max density information. However, the max density suffices to determine whether to perform density adjustment.

The max density information cannot be corrected by calibration when the target max density information is higher than the current max density information. By contrast, when the target max density information is lower than the current max density information, the max density information is matched to the target max density information by outputting in halftone using a halftone screen. For this reason, when the target max density information is higher than the current max density information, the density adjustment is performed before calibration, to set the current max density information to be equal to or higher than the target max density information.

FIG. 6 is a table of an example of stored max density adjustment amount, max density information, and temperature and humidity information in the image forming apparatus 100, according to the present embodiment. In the present embodiment, the data storage unit 105C stores, for each calibration condition (e.g., a sheet), the max density adjustment amount, the max density information, and the temperature and humidity information in association with each other. For example, as illustrated in FIG. 6, the data storage unit 105C stores the max density adjustment amount, the max density information, and the temperature and humidity information for "coated paper-gloss A".

Further, in the present embodiment, the max density adjustment amount of each color, the max density information (colorimetric value) of each color, and the temperature and humidity information are stored in the data storage unit 105C each time calibration is performed, for each calibration execution date and time (printing date and time of the gradation correction chart). The execution date and time of calibration is information used when the max density information is predicted using data stored in a particular time period.

In density adjustment of each color, it is typical to manage and control an adhesion amount of a color using parameters. In the present embodiment, as illustrated in FIG. 6, the printer 20 can control the max density adjustment amount of each color within a range from −5 to +5. The density adjustment execution unit 201 controls an adhesion amount of a color material so that the closer the max density adjustment amount is to −5, the lower the density, and closer the max density adjustment amount is to +5, the higher the density. The max density information has to be predicted in consideration of the state of the max density adjustment amount. For this reason, the max density adjustment amount is stored in the data storage unit 105C.

For example, the density characteristic prediction unit 105B predicts the max density information by using the max density information of the time when the max density adjustment amount is the same as the current max density adjustment amount among the past data stored in data storage unit 105C. In another example, the density characteristic prediction unit 105B calculates, as an assumed value, the max density information of the time when the max density adjustment amount is zero (in other words, no density adjustment) on the basis of the max density adjustment amount and the colorimetric value of the max density information associated with the max density adjustment amount. In this case, the density characteristic prediction unit 105B predicts the max density information on the basis of the assumed value.

The max density information is obtained from measured data of the gradation correction chart. The obtained max density information is stored in the data storage unit 105C as a colorimetric value of the max density information. Density information includes, for example, statuses T, E and A. However, in the present embodiment, the status of the density information is not defined.

The temperature and humidity information at the time when the gradation correction chart is printed (in other words, an image is outputted) is acquired from the printer 20 and stored in the data storage unit 105C. Since the density characteristic of the printer 20 is affected by temperature and humidity, the use of the environmental information enhances prediction accuracy of the max density information. In addition to the temperature and humidity information, any information that affects the density characteristic of the printer 20, such as the lifetime of parts of the printer 20 may be stored in the data storage unit 105C and used to predict the max density information.

FIG. 7 is a table of an example of the predicted max density information and the max density adjustment amount in the image forming apparatus 100, according to the present embodiment. In the present embodiment, the density adjustment execution unit 201 increases the max density adjustment amount of a color having the predicted max density information lower than the target max density information, on the basis of the target max density information and the predicted max density information. This controls the printer 20 to be in a condition in which the target max density information is obtained.

In the example of FIG. 7, the predicted max density information is lower than the target max density information for cyan (C) and black (K). For cyan (C), since the predicted max density information is lower than the target max density information by a small amount, the density adjustment execution unit 201 changes the max density adjustment amount to 2 by adding 1 to the current max density adjustment amount. For black (K), since the predicted max density information is lower than the target Max density information by an amount larger compared with cyan, the density adjustment execution unit 201 changes the max density adjustment amount to 2 by adding 2 to the current max density adjustment amount. For magenta (M) and yellow (Y), since the prediction result indicates that the target max density information is obtained, the current max density adjustment amount is kept unchanged.

Further, for a color having the predicted max density information higher than the target max density information, the target max density information can be obtained by performing calibration.

For this reason, the max density adjustment amount does not have to be lowered. However, when the predicted max density information is much higher than the target max density information, halftone screen processing of applying halftone dots to a solid portion is performed to obtain the target max density information. As a result, image quality degrades. For this reason, the density adjustment execution unit 201 may perform control to decrease the max density adjustment amount when the predicted max density information is higher than the target max density information.

The printer 20 prints the gradation correction chart after performing the above-described density adjustment. The gradation correction chart thus printed has the output characteristic that implements the target max density information of calibration. Depending on the state of the printer 20, the expected max density information may not be obtained even by increasing or decreasing the max density adjustment amount to the limit. In other words, there is a case where the predicted max density information is too different from the target max density information to obtain the target max density information by adjusting the max density information of the printer 20. In the embodiment, the case where the predicted is too different from the target max density information is, for example, a case where a difference between the predicted max density information and the target max density information exceeds a preset difference.

In this case, for example, the image forming apparatus 100 includes a notification unit that displays a message screen that recommends a user to recreate the target max density information by newly performing calibration or recommends calling a service. In other words, the image forming apparatus 100 may include a notification unit that notifies a user to check the target max density information or to call a service. This configuration allows a user to recognize that the target max density information cannot be obtained by density adjustment and recognize what countermeasure is to be taken.

Figure 8:
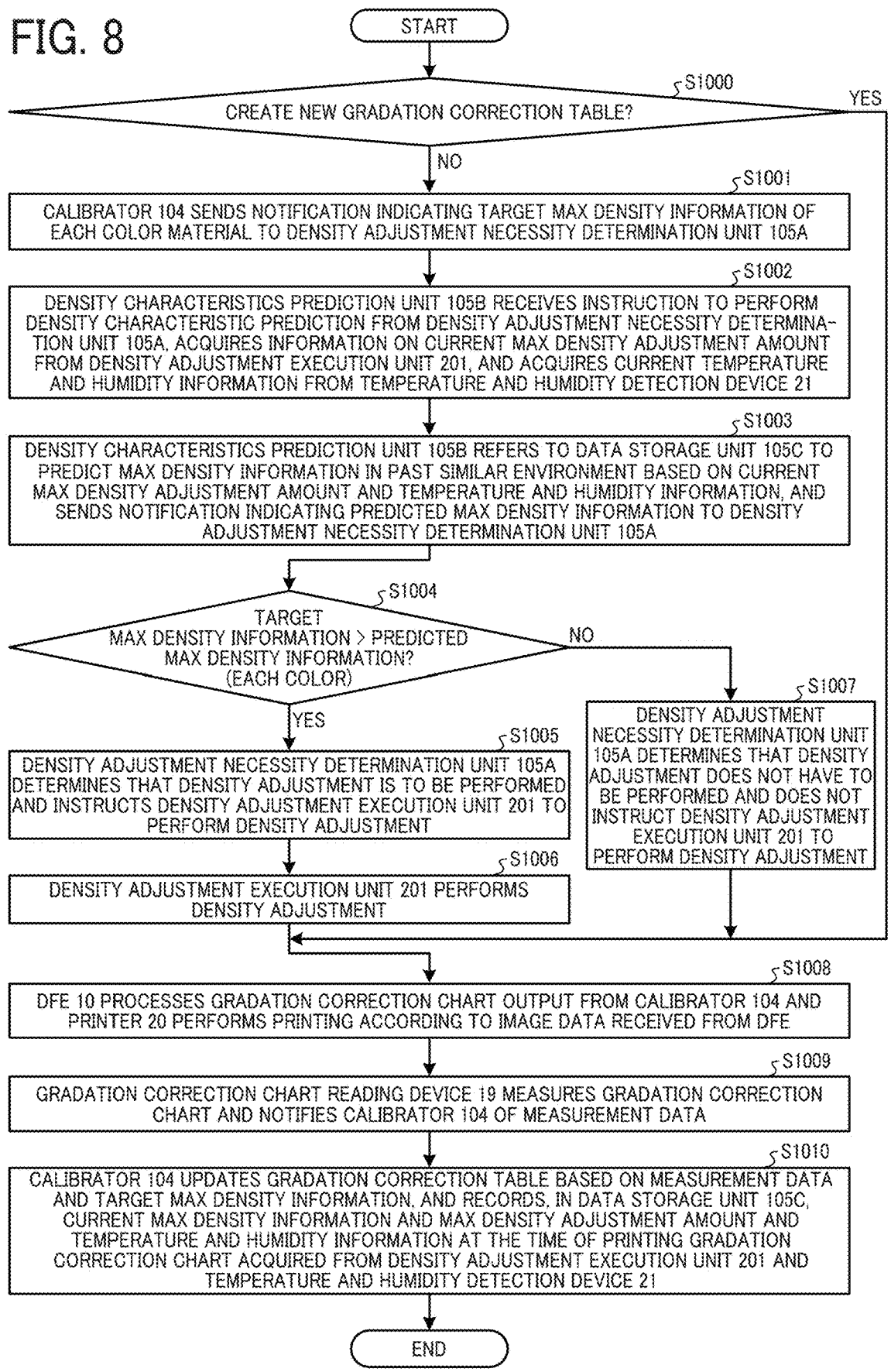
FIG. 8 is a flowchart illustrating an example of an operation of adjusting max density information by the image forming apparatus, according to an embodiment of the present disclosure.

FIG. 8 is a flowchart illustrating an example of an operation of adjusting the max density information by the image forming apparatus 100, according to the present embodiment.

When the gradation correction table has already been created at the time of performing calibration (step S1000: No), the calibrator 104 notifies the density adjustment necessity determination unit 105A of target max density information of each color material (step S1001). In response to receiving an instruction to predict the density characteristic from the density adjustment necessity determination unit 105A, the density characteristic prediction unit 105B acquires current max density adjustment amount from the density adjustment execution unit 201 (step S1002). Further, the density characteristic prediction unit 105B acquires current temperature and humidity information from the temperature and humidity detection device 21 (step S1002).

The density characteristic prediction unit 105B refers to the max density adjustment amount and the data storage unit 105C to predict max density information in a similar environment in the past on the basis of the current max density adjustment amount and the current temperature and humidity information. The density characteristic prediction unit 105B notifies the density adjustment necessity determination unit 105A of the predicted max density information (step S1003). Next, the density adjustment necessity determination unit 105A determines, for each color, whether the predicted max density information is less than the target max density information (step S1004).

On the basis of the determination result indicating that the predicted max density information is less than the target max density information for one or more certain colors (step S1004: Yes), the density adjustment necessity determination unit 105A determines that density adjustment is to be performed. The density adjustment necessity determination unit 105A instructs the density adjustment execution unit 201 to perform density adjustment for the one or more certain colors whose predicted max density information is less than the target max density information (step S1005). The density adjustment execution unit 201 performs density adjustment for each of the one or more certain colors whose predicted max density information is less than the target max density information (step S1006). By contrast, on the basis of the determination result indicating that the predicted max density information of each color is equal to or greater than the target max density information (step S1004: No), the density adjustment necessity determination unit 105A determines that density adjustment does not have to be performed and does not instruct the density adjustment execution unit 201 to perform density adjustment (step S1007).

After the execution of density adjustment based on the determination result indicating that density adjustment has to be performed, the DFE 10 processes the gradation correction chart output from the calibrator 104, and the printer 20 performs printing according to image data received from the DFE (step S1008). The gradation correction chart reading device 19 performs colorimetry on the printed gradation correction chart and notifies the calibrator 104 of measurement data of the gradation correction chart (step S1009). The calibrator 104 updates the gradation correction table on the basis of the measurement data and the target max density information, and records the current max density information, the max density adjustment amount at the time of printing the gradation correction chart acquired from the density adjustment execution unit 201, and the temperature and humidity information at the time of printing the gradation correction chart acquired from the temperature and humidity detection device 21 in the data storage unit 105C (step S1010).

When calibration is newly performed, since the target max density information has not yet been generated, the determination does not have to be performed whether to perform density adjustment before printing gradation correction chart. Accordingly, the process of step S1008 and subsequent steps are successively performed. In this case, it is still preferable to record the information in the data storage unit 105C, since the measurement data of the gradation correction chart can be used for prediction of the max density information. Since the target max density information is generated when the new calibration is completed, the determination whether to perform density adjustment is performed by using the information when calibration is updated next and subsequent times.

As described, according to the image forming apparatus 100 of the present embodiment, the colorimetric data of the gradation correction chart at the time of performing calibration in the past and the temperature and humidity information at the time of acquiring the colorimetric data are stored, and the current max density information of the image forming apparatus 100 is predicted on the basis of the current temperature and humidity information and the stored past data. When the predicted max density information satisfies the target max density information, the density adjustment of the image forming apparatus 100 is not performed. This reduces wasted sheets and efforts in printing and colorimetry of a chart for adjusting the density information of the image forming apparatus 100.

Although, in the above embodiment, the description is provided is of an example in which the image forming apparatus according to the embodiment is a multifunction peripheral having at least two of a copier function, a printer function, a scanner function, and a facsimile function, this is merely one example. In another example, aspects of this disclosure are applicable to any image forming apparatus such as a copier, a printer, a scanner, or a facsimile machine.

According to one or more embodiments of the present disclosure, wasted sheets and efforts for printing and colorimetry of a chart for adjusting output characteristics of an image forming apparatus are reduced.

An embodiment of the present disclosure includes a non-transitory computer-executable medium storing a program storing instructions, which when executed by an image forming apparatus, causes the image forming apparatus to perform an image forming method. The method includes predicting an output characteristic of an image formed by the image forming apparatus based on a colorimetric value associated with particular environmental information among environmental information stored in a memory that stores the colorimetric value of a gradation correction chart that is output by the image forming apparatus and the environmental information each time of acquisition of the colorimetric value, the particular environment information being within a predetermined range with reference to current environmental information, when the image forming apparatus is to output the gradation correction chart. The method includes adjusting the output characteristic of the image formed by the image forming apparatus in a case that the predicted output characteristic is lower than a target output characteristic that is set in advance for input image data according to which the image forming apparatus performs an image output. The method includes correcting a gradation correction table based on the colorimetric value of the gradation correction chart that is output by the image forming apparatus and the target output characteristic.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus, comprising:
   a memory that stores a colorimetric value of a gradation correction chart that is output by the image forming apparatus and environmental information each time of acquisition of the colorimetric value; and
   circuitry configured to
      predict a maximum density of an image formed by the image forming apparatus based on the colorimetric value associated with particular environmental information among the environmental information stored in the memory, the particular environmental information being within a predetermined range with reference to current environmental information, when the image forming apparatus is to output the gradation correction chart,
      adjust the maximum density of the image formed by the image forming apparatus in a case that the predicted maximum density is lower than a target maximum density that is set in advance for input image data according to which the image forming apparatus performs an image output, and
      correct a gradation correction table based on the colorimetric value of the gradation correction chart that is output by the image forming apparatus and the target maximum density.

2. The image forming apparatus of claim 1, wherein the environmental information includes information on temperature and humidity.

3. The image forming apparatus of claim 1, wherein the circuitry is further configured to notify a user that the maximum density of the image formed by the image forming apparatus is to be adjusted in the case that the predicted output characteristic is lower than the target maximum density.

4. The image forming apparatus of claim 1, wherein in a case that the colorimetric value used in predicting the maximum density is insufficient, the circuitry allows a user to select whether to adjust the maximum density of the image formed by the image forming apparatus.

5. The image forming apparatus of claim 1, further comprising an interface configured to instruct to correct the gradation correction table,
wherein the circuitry predicts the maximum density in response to an instruction from the interface before an output of the gradation correction chart.

6. The image forming apparatus of claim 1, wherein the circuitry is further configured to prompt a user to review the target maximum density or call a service in a case that the predicted maximum density is too different from the target maximum density to obtain the target maximum density by adjusting the maximum density of the image formed by the image forming apparatus.

7. The image forming apparatus of claim 1, wherein based on the target maximum density being greater than the predicted maximum density, outputting the gradation correction chart.

8. The image forming apparatus of claim 1, wherein the circuitry is configured to determine the particular environmental information based on the current environmental information and the predetermined range.

9. An image forming system, comprising:
a memory that stores a colorimetric value of a gradation correction chart that is output by the image forming system and environmental information each time of acquisition of the colorimetric value; and
circuitry configured to
predict a maximum density of an image formed by the image forming system based on the colorimetric value associated with particular environmental information among the environmental information stored in the memory, the particular environmental information being within a predetermined range with reference to current environmental information, when the image forming system is to output the gradation correction chart,
adjust the maximum density of the image formed by the image forming system in a case that the predicted maximum density is lower than a target maximum density that is set in advance for input image data according to which the image forming system performs an image output, and
correct a gradation correction table based on the colorimetric value of the gradation correction chart that is output by the image forming system and the target maximum density.

10. An image forming method performed by an image forming apparatus, the method comprising:
predicting a maximum density of an image formed by the image forming apparatus based on a colorimetric value associated with particular environmental information among environmental information stored in a memory that stores the colorimetric value of a gradation correction chart that is output by the image forming apparatus and the environmental information each time of acquisition of the colorimetric value, the particular environment information being within a predetermined range with reference to current environmental information, when the image forming apparatus is to output the gradation correction chart;
adjusting the maximum density of the image formed by the image forming apparatus in a case that the predicted maximum density is lower than a target maximum density that is set in advance for input image data according to which the image forming apparatus performs an image output; and
correcting a gradation correction table based on the colorimetric value of the gradation correction chart that is output by the image forming apparatus and the target maximum density.

* * * * *